United States Patent [19]

Jochum et al.

[11] Patent Number: 5,093,103
[45] Date of Patent: Mar. 3, 1992

[54] PROCESS FOR SEPARATING OFF POISONOUS VOLATILE CHEMICAL COMPOUNDS FROM A MIXTURE OF SOLID PARTICLES HAVING A PARTICLE SIZE OF UP TO 200 MICRONS

[75] Inventors: Joachim Jochum, Baden, Switzerland; Harald Jodeit, Waldshut, Fed. Rep. of Germany; Christian Wieckert, Baden, Switzerland

[73] Assignee: BBC Brown Boveri AG, Baden, Switzerland

[21] Appl. No.: 264,044

[22] Filed: Oct. 28, 1988

[30] Foreign Application Priority Data

Oct. 30, 1987 [CH] Switzerland ............... 4262/87

[51] Int. Cl.⁵ .................. C21B 7/22; C21C 5/38
[52] U.S. Cl. ..................... 423/659; 422/288; 266/157; 55/267
[58] Field of Search .......... 423/210.5, 659, 44, 423/97, 107, 108; 75/10.29, 10.30, 10.31, 407, 411; 422/287, 288; 266/157; 55/267; 110/216

[56] References Cited

U.S. PATENT DOCUMENTS

| | | | |
|---|---|---|---|
| 2,060,070 | 11/1936 | Hansgirg | 266/157 |
| 3,449,117 | 6/1969 | Derham | 75/10.29 |
| 3,746,324 | 7/1973 | Ojima | 266/1 R |
| 3,853,504 | 12/1974 | Buscher | 55/80 |
| 4,227,922 | 10/1980 | Laws et al. | 75/64 |
| 4,372,780 | 2/1983 | Madelin | 75/658 |
| 4,525,208 | 6/1985 | Yasukawa et al. | 75/25 |
| 4,634,493 | 1/1987 | Devaney | 156/616.41 |
| 4,957,551 | 9/1990 | Aune | 75/10.3 |

FOREIGN PATENT DOCUMENTS

| | | |
|---|---|---|
| 0007856 | 2/1980 | European Pat. Off. . |
| 1356615 | 2/1964 | France . |
| 2457904 | 12/1980 | France . |
| 2054657 | 2/1981 | United Kingdom ....... 423/DIG. 20 |

OTHER PUBLICATIONS

Patent Abstract of Japan, vol. 10, No. 31 (C-327) (2088), Feb. 6, 1986 & JP 60-184643 Sep. 20, 1985 Treating Device for Dust and Sludge, Masao Tomari.

Primary Examiner—Gary P. Straub
Assistant Examiner—Timothy C. Yanoy
Attorney, Agent, or Firm—Oblon, Spivak, McClelland, Maier & Neustadt

[57] ABSTRACT

A process for separating off poisonous volatile chemical compounds from a mixture (7) of solid particles having a particle size of up to 200 μm, the mixture being brought continuously or intermittently at an average rate of 5° to 200° C./min in zones of progressively increasing temperature up to 1350° C. and the poisonous chemical compounds being evaporated and forced to leave the reaction space (6). The poisonous compounds are subsequently condensed and discharged. The non-evaporated residue is gradually melted, and the melt (8) is continuously or intermittently discharged from the reaction space (6) and solidified. The particles carried over into the gas phase are preferably retained by a hot gas filter, liquefied and passed into the melt.

3 Claims, 1 Drawing Sheet

PROCESS FOR SEPARATING OFF POISONOUS VOLATILE CHEMICAL COMPOUNDS FROM A MIXTURE OF SOLID PARTICLES HAVING A PARTICLE SIZE OF UP TO 200 MICRONS

BACKGROUND OF THE INVENTION

1. Field of the Invention

Processing residues in powder form which are charged with harmful substances, in most cases originating from combustion processes.

Dust deposition and gas purification have become more important in the context of environmental regulation. More stringent requirements are therefore also demanded of the concomitant further processing and storage of the harmful substances and their carriers.

The invention relates to the further development, improvement and simplification of separating off harmful substances to be treated separately from a complex particle mixture formed in combustion processes.

In particular, it relates to a process for separating off poisonous volatile chemical compounds from a mixture of solid particles having a particle size of up to 200 $\mu$m.

2. Discussion of Background

Filter dust of industrial incineration plants, especially electrofilter dust, has a high percentage of polluting, enviromentally-unsafe harmful substances, some of which are poisonous. They include certain organic and in particular heavy metal compounds, for example of the elements Pb, Zn, Cd, Tl, Cu. Therefore, special regulations apply to such mixtures, and the filter dust must be considered and treated as special waste.

Currently, the treatment is carried out using 3 principles:

Agglomeration and compacting of the dust to give larger pieces by means of binders such as cement, asphalt etc., followed by ultimate disposal on a sanitary landfill (cf. "Behandlung und Verfestigung von Ruckstanden aus Kehrichtverbrennungsanlagen" (treatment and solidification of residues from waste incineration plants) Schriftenreihe Umweltschutz No. 62, Bundesamt fur Umweltschutz, Bern 1987). This gives a product whose mass is greater than that of the loose starting material. For this reason, the ultimate disposal becomes expensive and problematical due to the, in most cases, only limited availability of space.

Chemical treatment with acids. The heavy metal compounds are leached out using aqueous acids. The residue free of heavy metals is stored in a sanitary landfill, the acidic solutions containing heavy metals are further processed (cf. H. Vogg "Rauchgasreinigungsverfahren" (A process for the purification of fumes), talk given at the VDI seminar 43-32-02 "Abfallbehandlung und -ver-wertung durch Mullver-brennung" (treatment and utilization of waste by waste incineration) VDI, Dusseldorf 1986). However, these leaching out processes do not represent final solutions of the waste problem. The further treatment of the solutions containing heavy metals and their concentration is associated with a considerate energy consumption. New problems are created (waste water, pollution).

Thermomechanical separation by heating the dust charged with heavy metals in a gas stream, evaporation of the heavy metal compounds and mechanical removal of the solid suspended particles from the gas phase at high temperatures (hot gas cyclone, hot gas filter etc.). The heavy metal vapours are subsequently condensed in a cooler (cf. W. Weissweiler et al., "Anreicherung von Thallium- und Bleihalogeniden" (Concentration of thallium halides and lead halides), Staub, Reinhaltung der Luft, vol. 46, No. 3, p. 120-124, March 1986). The hot gas separators (cyclones, electrofilters, ceramic honey-comb filters etc.) have to operate isothermically at high temperatures (1000° C. and more), which makes very high demands on their construction and operation. In addition, the removal of the fine dust (particle diameter less than 1 $\mu$m), which, as the carrier of the heavy metal compounds, weighs too heavily in terms of its percentage, is hardly feasible using economical methods.

SUMMARY OF THE INVENTION

Accordingly, one object of this invention is to provide a novel process for removing poisonous volatile chemical compounds from a mixture of solid particles originating from the filter dust of incineration plants of any kind which while utilizing the principle of evaporation and subsequent condensation of the harmful substances to be separated off avoids the expensive aid of a carrier gas and the subsequent mechanical separation of the vapor of the harmful substances and dust particles from this gas and also the redeposition later on of the condensed harmful substances on the fine dust particles. The process is intended to be simple and to guarantee an as economical as possible, individual further processing of the different separated products for the purpose of ultimate disposal.

This object is achieved by bringing the mixture in the process mentioned at the outset continuously or intermittently into zones of progressively increasing temperature, the residence time in a given temperature interval being such that each particle is heated to a temperature of 1350° C. at an average rate of 5° to 200° C./min, at least some of the poisonous chemical compounds being evaporated and forced to leave the reaction space and subsequently being condensed by cooling and being discharged, and that the non-evaporated residue is gradually melted and the melt thus formed is discharged from the reaction space continuously or intermittently, cooled off and solidified.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
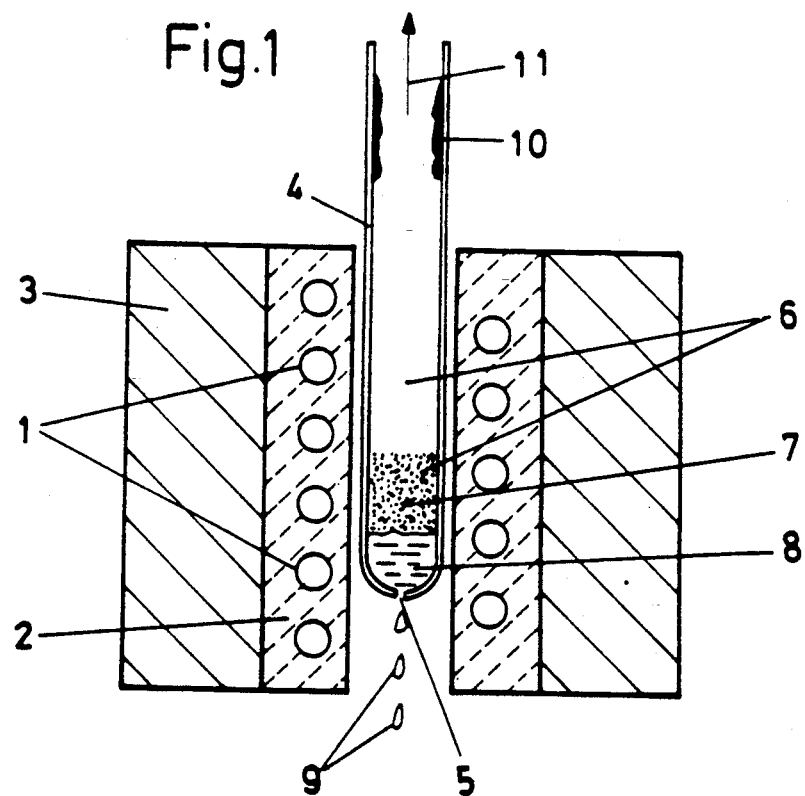
FIG. 1 shows a schematic diagram of an experimental arrangement for carrying out a process with disconinuous (intermittent) feed of a mixture of solid particles.

Referring now to the drawings, wherein like reference numerals designate identical or corresponding parts throughout the several views, in FIG. 1, a schematic diagram (front view, longitudinal section) of an experimental arrangement for carrying out a process with discontinuous (intermittent) feed of a mixture of solid particles is shown. The arrangement essentially consists of a furnace consisting of a helical electric heat conductor 1 in a heat conductor embedding 2 and a heat insulation 3. The heat conductor 1 consists of a high-temperature material (for example silicon carbide). 4 is a ceramic tube (for example made of $Al_2O_3$) sealed at its bottom end and provided with an opening 5. 6 is the reaction space. 7 represents a mixture of solid particles (filter dust, fly ash), which contains the harmful substances to be removed and is converted gradually into a melt 8 by supplying heat. Melt 8 is thus the non-evaporated residue of the feed. 9 are the droplets of the melt falling through the opening 5. Towards the upper end of the ceramic tube 4, the condensate 10 of the evaporated poisonous compounds is formed on the inside. Arrow 11 indicates the discharge of the gas phase.

Figure 2:
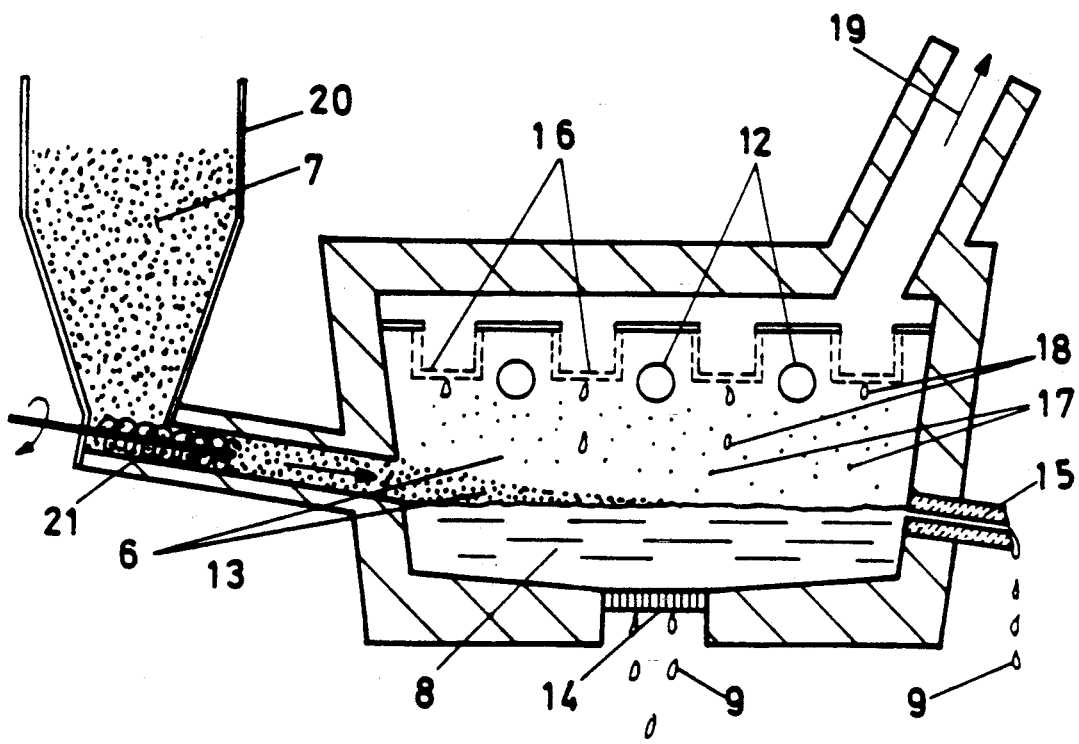
FIG. 2 shows a schematic diagram of a plant for carrying out a process for continous feed of a mixture of solid particles.

FIG. 2 shows a schematic diagram of a plant for carrying out a process with continuous feed of a mixture of solid particles. The reference numerals 6, 7, 8 and 9 correspond exactly to those of FIG. 1. 12 are rod-like electric heat conductors (for example silicon carbide), 13 is the furnace made of refractory ceramic material (for example $Al_2O_3$). 14 represents a grid or filter means of ceramic material (for example $Al_2O_3$) for the removal of slag 8. Alternatively, an overflow tube (tap hole) 15 made of ceramic material (preferably also $Al_2O_3$) for the removal of the slag is present. 16 is a hot gas filter made of ceramic material ($Al_2O_3$) present in the gas/vapor stream above the surface of the bath of melt 8 and heated by heat conductors 12. 17 represents the finest particles carried over by the gas/vapor stream. 18 is the droplets of the liquefied finest particles which remain suspended on the hot gas filter 16 and are absorbed by melt 8. 19 denotes the discharge of the gas/vapor phase leading to the cooling device (not drawn!). 20 is a container for the mixture of solid particles, 21 a mechanical transport device (screw conveyor) for the mixture.

WORKING EXAMPLE 1

See FIG. 1!

A ceramic tube 4 made of $Al_2O_3$ is inserted into a tubular furnace consisting of a helical heat conductor 1, an embedding 2 and a heat insulation 3. Ceramic tube 4 has the following dimensions:

|   |   |   |
|---|---|---|
| Outer diameter | 30 mm |
| Wall thickness | 2.5 mm |
| Length | 600 mm |

Ceramic tube 4 was provided with an opening 5, 2 mm in diameter, at its sealed bottom end. Ceramic tube 4 was charged with 20 g of a mixture 7 of solid particles in the form of filter dust having a particle size between 0.1 μm and 200 μm and originating from a waste incineration plant. The tube was then inserted in the oven, and its contents were heated to a temperature of 1300° C. over a period of 3.5 hours and maintained at this temperature for ½ hour.

The filter dust contained inter alia the following metals:

|   |   |
|---|---|
| Ca: | 11.5% |
| Cu: | 0.09% |
| Zn: | 3.3% |
| Pb: | 0.8% |
| Cd: | 0.05% |
| Sn: | 0.34% |

-continued

|   |   |
|---|---|
| Sb: | 0.16% |
| Ba: | 0.34% |

As early as during the heating-up period, most of the volatile harmful heavy metal compounds evaporated and formed a condensate 10 on the inside wall of the upper cool segment of tube 4, while the non-evaporated residue formed melt 8. The latter passed downward through the opening 5 in the form of droplets. The droplets 9, after solidification now only had a glass-like (slag-like) appearance. Their volume was about 20% of the bulk volume of the local mixture 7.

The ratios of the amounts are as follows:

|   |   |
|---|---|
| Melt: | 16 g |
| Condensate: | 3 g |
| Gas: | 1 g |

Filter dust and melt were analysed before and after the thermal removal of the heavy metal compounds. The following ratios were found:

|   | Amount | |
|---|---|---|
|   | Before separation (dust) 20 g | After separation (melt) 16 g |
| Zn content | 3.3% | 2.0% |
| Pb content | 0.8% | 0.1% |
| Cd content | 0.05% | <0.01% |

For the purpose of final storage and further treatment, the percentage of soluble heavy metals in the particular product is critical. Samples of the filter dust were therefore leached out with $CO_2$-saturated water before and after the separation (melt), and the solutions were tested for their heavy metal ion content:

| Heavy metal | Before separation (dust) (mg/l of solution) | After separation (melt) (mg/l of solution) |
|---|---|---|
| $Zn^{2+}$ | 1600 | 0.25 |
| $Pb^{2+}$ | 13 | 0.09 |
| $Cd^{2+}$ | 37 | 0.08 |

Although most of the zinc did not just evaporate, but evidently reacted with other dust constituents such as $SiO_2$, CaO, MgO, $Fe_2O_3$ etc to form compounds, the soluble portion was reduced to a safe level. On the other hand, more than 80% of the lead and cadmium evaporated and were found again in the condensate. The molten and resolidified residue can therefore safely be stored on a conventional sanitary landfill of non-poisonous waste substances.

WORKING EXAMPLE 2

See FIG. 2!

A flat open earth furnace 13 made of ceramic material ($Al_2O_3$) was available for heating and melting the dust of a waste incineration plant. In its upper third, a number of rod-like electric heat conductors 12 made of silicon carbide were present. This made it possible to obtain temperatures of up to about 1450° C. inside the furnace. In the center of the furnace, a grid (filter) 14 made of ceramic material ($Al_2O_3$) was arranged at its deepest point. This grid had a large number of openings, each 1 mm wide. Above the heat conductors 12, a hot gas filter 16 made of ceramic material ($Al_2O_3$) was present. The fibers of the filter had a thickness of 1 μm; the porosity had a value of more than 90%. Its function was to retain the finest particle carried over and suspended 17 by the gas and vapor stream formed in the reaction space 6. The liquefied finest particles which were retained by the hot gas filter 16 could trickle down on the latter and reach the melt 8 as droplets 18. Above the hot gas filter 16, the discharge 19 for the purified vapor and gas phase leading to the cooling device (not drawn) was arranged. Furnace 13 was fed with a mixture 7 from a container 20 via a mechanical transport device 21, in the present case via a screw conveyor. Care was taken that furnace 13 was sealed off air-tight from the surroundings.

Furnace 13 was charged with a specific amount of 10 kg/h of filter dust from a waste incineration plant. The dust had the same composition and particle size as that in Example 1. The temperature of the melt was about 1350° C. At this temperature, a continuous discharge of the melt could be achieved. Droplets 9 were collected in a water tank and granulated.

The ratios of the amounts were as follows:

| | |
|---|---|
| Melt: | 8.5 kg/h |
| Condensate: | 1 kg/h |
| Gas: | 0.5 kg/h |

Filter dust and melt were analysed before and after the removal of heavy metal compounds. The following ratios of the amounts were found:

| | Amount | |
|---|---|---|
| | Before separation (dust) 10 kg/h | After separation (melt) 8.5 kg/h |
| Zn content | 3.3% | 2.2% |
| Pb content | 0.8% | 0.08% |
| Cd content | 0.05% | 0.008% |

The samples were leached out with $CO_2$-saturated water according to Example 1, and the solutions were tested for their heavy metal ion content.

| Heavy metal | Before separation (dust) (mg/l of solution) | After separation (melt) (mg/l of solution) |
|---|---|---|
| $Zn^{2+}$ | 1600 | 0.35 |
| $Pb^{2+}$ | 13 | 0.15 |
| $Cd^{2+}$ | 37 | 0.12 |

Thus, similar ratios to those of Example 1 were found. The residue can be safely stored on a conventional sanitary landfill.

In a different variation, furnace 13 used was one which was equipped with an overflow tube (tap hole) 19 made of ceramic material ($Al_2O_3$) for removing melt 8 instead of being equipped with the grid 14.

Grid 14 or overflow tube 15 can be designed to be controllable, thus maintaining the level of melt 8 always at the same height. The residence time (heating up and stopping time) of each feed component depends on the construction of the furnace and operation of the furnace (output, temperature, amount processed etc.) and can be adapted to the particular situation.

The invention is not limited to the working examples. The mixture of particles having a size of up to 200 μm is brought continuously or intermittently (batchwise process) into zones of progressively increasing temperature. The heat can in this case be supplied progressively not only in terms of location but also of time. The residence time is such that each particle is heated to a temperature of about 1300° C. at an average rate of 5° to 200° C./min and maintained for a certain time at the highest temperature. This leads to residence times of ½ hour to about 4 hours. At least some of the poisonous chemical compounds are evaporated and forced to leave the reaction space, and are subsequently condensed and discharged. The non-evaporated residue is gradually melted and the melt is discharged from the reaction space continuously or intermittently (batchwise) cooled and solidified. The mixture of particles is delivered to the zones of increasing temperature preferably by mechanical means and heated indirectly by means of electrical energy by resistance or induction heating or by gas heating. The discharge of the melt takes place from the bottom through one or more openings of a grid, filter, overflow or a syphon. The particles carrier over by the gas and vapor stream (evaporated chemical compounds) are advantageously trapped on a hot gas filter arranged in the reaction space and maintained at the melting temperature of the particles, liquefied and passed into the melt. The material of the melt no longer containing any harmful amounts of poisonous substances is enlarged in size by molding, agglomerating or is briquetting or is granulated by quenching.

An arrangement for carrying out the process consists of an electric heat conductor or a furnace containing induction coils or gas burners, which has at the entry a device for feeding the mixture and at the exit a device for discharging the melt and contains means for separating the non-melted portion of the mixture/melt and suspended particles/gas phase. These means are made of ceramic construction materials having a high resistance to corrosion and erosion at the operating temperature, and in particular resistant with respect to aggressive melts (filters, grids, overflows, fabrics, non-wovens etc.).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for separating off poisonous volatile chemical compounds from a mixture of solid particles having a particle size of up to 200 μm, including filter dust from combustion units, comprising the steps of:
   using mechanical means to bring the solid particles into a reaction space;
   progressively heating the particles in the reaction space via indirect electrical heaters at an average rate of 5° to 200° C./min until the particles have a temperatures of 1350° C., whereby at least some of the poisonous chemical compounds are evaporated and the non-evaporated residue is gradually melted, wherein the indirect heaters are positioned above the melted residue;

trapping dust particles carried over by the stream of the evaporated chemical compounds at the surface of a hot gas filter in said reaction space above the melt, wherein said hot gas filter is heated by the heaters and maintained at the melting temperature of said dust particles, and wherein the particles trapped by the hot gas filter are melted and returned to the melted residue;

permitting at least some of the evaporated chemical compounds to condense outside the reaction space;

discharging the melted residue through openings at the bottom of the reaction space; and permitting the discharged residue to cool and solidify.

2. The process of claim 1 where said hot gas filter is heated by the heaters and maintained at a melting temperature of the particles, whereby the particles trapped by the filter are melted and returned to the melted residue.

3. The process of claim 1 including the step of further treating the solidified residue in a further treatment comprising one from the group consisting of molding, agglomerating, briquetting and granulating.

* * * * *